United States Patent
Dahiya et al.

(10) Patent No.: US 12,242,315 B2
(45) Date of Patent: Mar. 4, 2025

(54) THERMAL MANAGEMENT IN HORIZONTALLY OR VERTICALLY STACKED DIES

(71) Applicant: Intel Corporation, Santa Clara, CA (US)

(72) Inventors: Somvir Singh Dahiya, Bengaluru (IN); Stephen Gunther, Beaverton, OR (US); Julien Sebot, Portland, OR (US); Randy Osborne, Beaverton, OR (US); Scot Kellar, Bend, OR (US); Joshua Een, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 17/203,571

(22) Filed: Mar. 16, 2021

(65) Prior Publication Data
US 2022/0300049 A1    Sep. 22, 2022

(51) Int. Cl.
*G06F 1/32*      (2019.01)
*G05B 6/02*      (2006.01)
*G06F 1/20*      (2006.01)
*G06F 1/3287*    (2019.01)
*G06F 1/3203*    (2019.01)

(52) U.S. Cl.
CPC ........... *G06F 1/206* (2013.01); *G05B 6/02* (2013.01); *G06F 1/3287* (2013.01); *G06F 1/3203* (2013.01)

(58) Field of Classification Search
CPC ...... G06F 1/206; G06F 1/3287; G06F 1/3206; G06F 1/324; G06F 1/3243; G06F 1/3296; G05B 6/02; Y02D 10/00

USPC ........................................................ 713/320
See application file for complete search history.

(56) References Cited

U.S. PATENT DOCUMENTS

| | | | | |
|---|---|---|---|---|
| 7,512,514 | B2* | 3/2009 | Duarte | G01K 7/015 |
| | | | | 702/132 |
| 9,653,144 | B1* | 5/2017 | Man | G11C 11/40626 |
| 2004/0204899 | A1* | 10/2004 | Gunther | G06F 1/324 |
| | | | | 702/132 |
| 2012/0163413 | A1* | 6/2012 | Kim | H01L 23/5258 |
| | | | | 257/467 |
| 2012/0249218 | A1* | 10/2012 | Shoemaker | G01K 3/08 |
| | | | | 327/512 |

(Continued)

OTHER PUBLICATIONS

International Search Report and Written Opinion, PCT App. No. PCT/US2022/016606, May 30, 2022, 9 pages.

*Primary Examiner* — Volvick Derose
(74) *Attorney, Agent, or Firm* — NICHOLSON DE VOS WEBSTER & ELLIOTT LLP

(57) ABSTRACT

A thermal management scheme, for a multichip module, that is aware of various dies in a stack (horizontal and/or vertical) and heat generated from them, local hot spots in a victim die, and hot spots in aggressor die(s). Each victim die receives telemetry information from thermal sensors located in aggressor dies as well as local thermal sensors in the victim die. The telemetry information is used to enable a virtual sensing scheme where temperature for a target die (e.g., a victim die) and/or its intellectual property (IP) domain is estimated or calculated. The estimated or calculated temperature is then used for performance management of the victim and/or aggressor dies in the stack.

30 Claims, 5 Drawing Sheets

(56) References Cited

U.S. PATENT DOCUMENTS

| | | | |
|---|---|---|---|
| 2014/0022002 A1* | 1/2014 | Chua-Eoan | G06F 1/206 |
| | | | 327/512 |
| 2014/0140156 A1* | 5/2014 | Shoemaker | G11C 11/40615 |
| | | | 365/201 |
| 2016/0300816 A1* | 10/2016 | Park | H01L 25/0657 |
| 2018/0073933 A1* | 3/2018 | Keskin | G01K 1/14 |
| 2019/0050040 A1* | 2/2019 | Baskaran | G06N 3/063 |
| 2019/0161341 A1* | 5/2019 | Howe | B81C 1/00301 |
| 2020/0293438 A1* | 9/2020 | Walker | G06F 3/0604 |

* cited by examiner

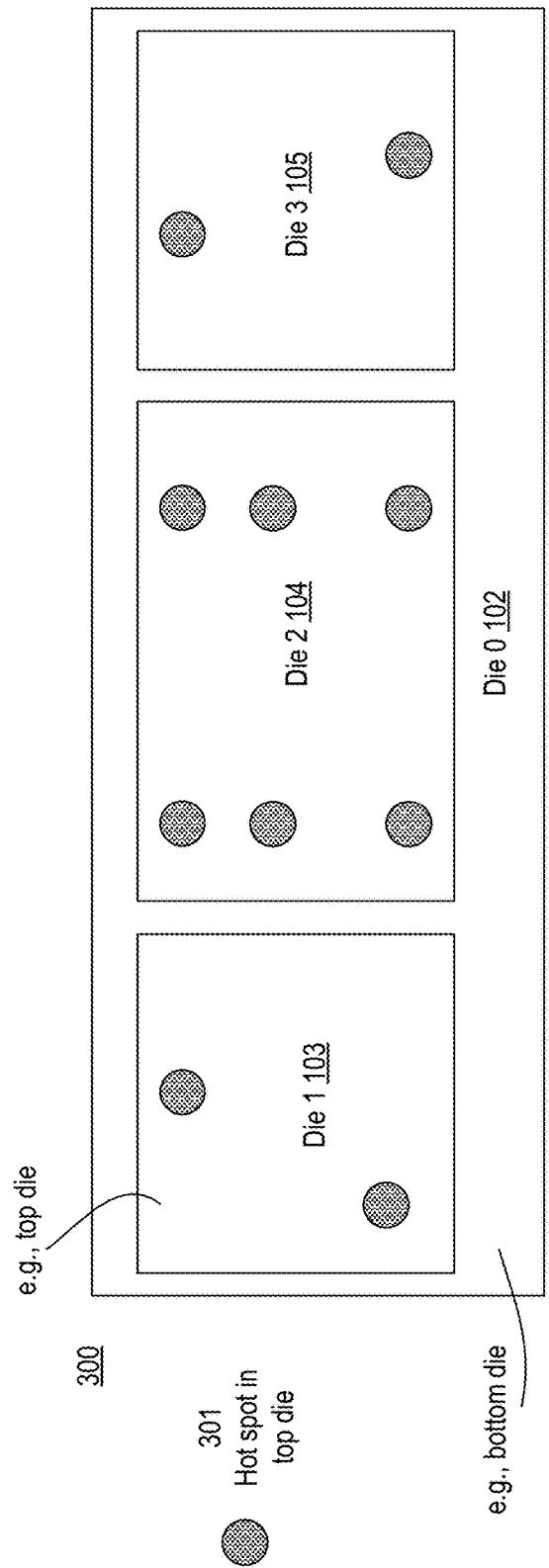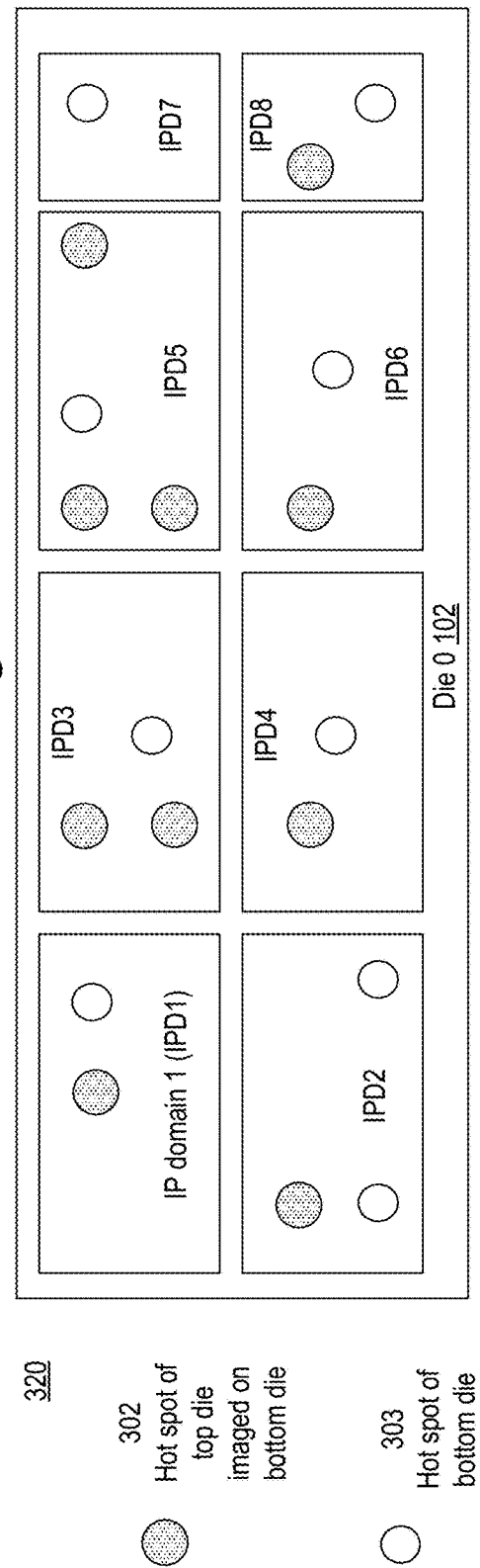

THERMAL MANAGEMENT IN HORIZONTALLY OR VERTICALLY STACKED DIES

BACKGROUND

In multichip modules where, multiple dies are stacked on top of each other (e.g., vertical stacking) or stacked along their sides (e.g., horizontal stacking) in a single package, hot spots in a first set of dies (aggressor dies) can impact thermal constraints of a second set of dies (e.g., victim dies). Existing schemes use thermal sensors near hotspots of their respective dies without considering thermal impacts from neighboring dies in the horizontal and/or vertical stack. As such, performance management (e.g., frequency and/or voltage control) for the multichip modules is inaccurate and may lead to reliability issues in some cases, and low performance settings in other cases.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 3A-B illustrates top views, respectively, of hot spot mapping from aggressor dies to victim die, and victim die hotspots, and logic to generate virtual thermal sensing to predict temperature for the victim die using telemetry from aggressor dies, in accordance with some embodiments.

DETAILED DESCRIPTION

Figure 1:
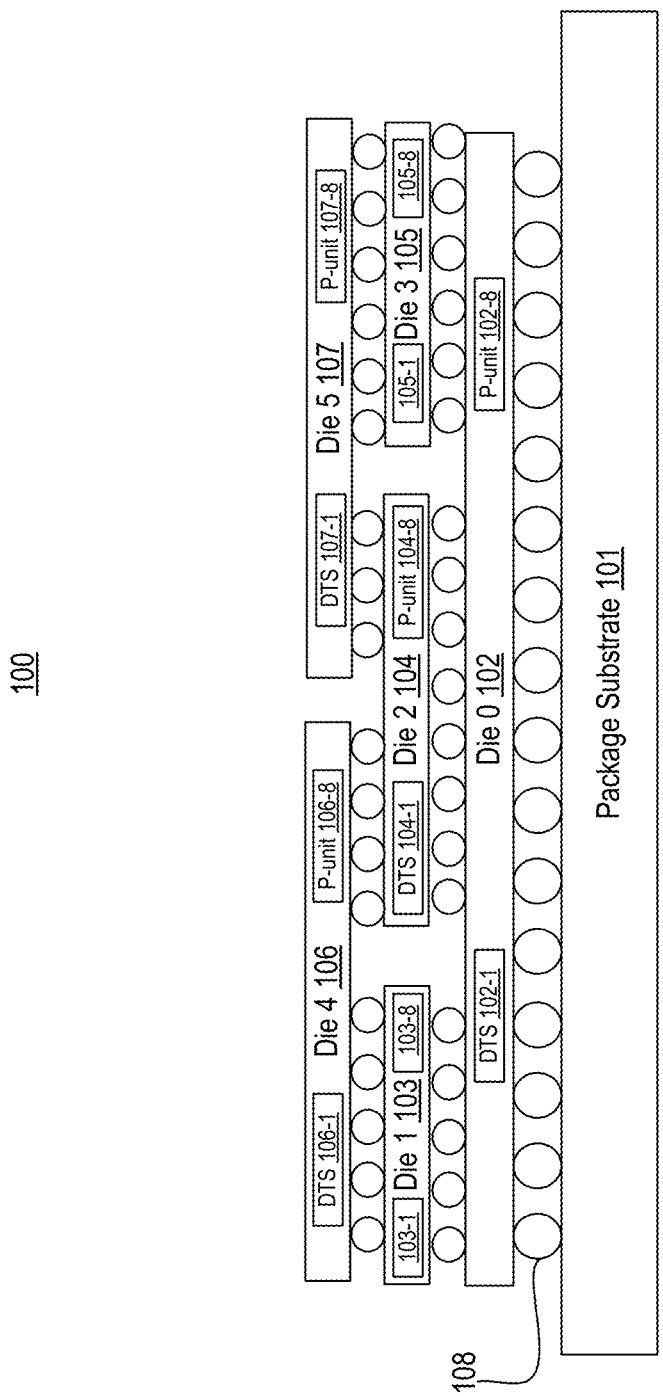
FIG. 1 illustrates a multi-chip module having a thermal management system that uses telemetry from local die sensors and from other dies to generate a virtual thermal sensing to predict temperature for a target die or intellectual property domain, in accordance with some embodiments.

Some embodiments describe a thermal management scheme that is aware of various dies in a stack (horizontal and/or vertical) and heat generated from them, local hot spots in a victim die, and hot spots in aggressor die(s). Each victim die receives telemetry information from thermal sensors located in aggressor dies as well as local thermal sensors in the victim die. Here, an aggressor die generally refers to a die whose heat impacts temperature of another die. The other die is referred to as the victim die whose temperature increases because of heat from one or more aggressor dies.

The telemetry information is used to enable a virtual sensing scheme where temperature for a target die (e.g., a victim die) and/or its intellectual property (IP) domain is estimated or calculated. The estimated or calculated temperature is then used for performance management of the victim and/or aggressor dies in the stack. Here, performance management refers to adjusting voltage (e.g., operating supply voltage), frequency (e.g., operating frequency of a clock used in an IP domain), bandwidth (e.g., bandwidth of an I/O lane or bus such as an I/O lane to a memory or a high-speed IO (HSIO)), adjusting a refresh rate (e.g., for a memory die) based on the estimated or calculated temperature. Since the estimated or calculated temperature of a victim die is generated from telemetry information from various dies, the thermal sensor of the victim die is referred to as the virtual thermal sensor. In some embodiments, a thermal management proportional-integral-derivative (PID) controller uses the virtual thermal sensor temperature to manage frequency, power, and/or refresh rate for an IP domain.

While various embodiments are described with reference to aggressor and victim dies, the same concept of determining temperature can be used at a lower level granularity. For example, a die may have many IP domains. Heat generated from one or more domains can impact a temperature of another IP domain in the same die. In that case, the IP domain whose temperature increases because of heat from other IP domains in the same die is referred as the victim IP domain, while the IP domain(s) that produce the heat that impacts other IP domains is referred to as the aggressor IP domain. Telemetry information from thermal sensors in the aggressor IP domain can be used to determine temperature of a victim IP domain. In some embodiments, the victim IP domain also uses telemetry information from other aggressor dies along with telemetry information from aggressor IP domains of the same die to determine temperature of a victim IP domain.

There are various technical effects of these embodiments. For example, the virtual thermal sensor decouples dielet design from each other allowing dielets to be re-used as IP blocks in various products or market segments. The decoupling of dielet design happens because placement of thermal sensors may not be fixed per dielet design as telemetry information from various sensors from different dies is used to determine a virtual thermal sensor temperature. The thermal management scheme of some embodiments relaxes (or reduces) the total number of thermal sensors used in a multichip module because thermal sensors (e.g., diodes) can be placed merely in local hot spots of a die. As such, thermal sensors for hot spots caused from other dies (e.g., aggressor dies) can be removed since telemetry information can be used to determine the virtual thermal sensor temperature of a victim die. By reducing the number of thermal sensors, power and area is reduced. In a typical multichip module, one die's hotspot may move from the sensor location due to heating from above, below, or from the side die(s). The virtual thermal sensor of various embodiments can be tuned (by hardware and/or software) to detect this moving hotspot by using telemetry data from both in-plane (e.g., local) sensors and thermal sensors from above, below, or from the side die(s). Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates multi-chip module 100 having a thermal management system that uses telemetry from local die sensors and from other dies to generate a virtual thermal sensing to predict temperature for a target die or intellectual property (IP) domain, in accordance with some embodiments. In this example, multi-chip module 100 comprises a package substrate 101 which is electrically coupled to a number of dies directly or indirectly. multi-chip module 100 comprises die 0 102, die 1 103, die 2 104, die 3 105, die 4 106, and die 5 107 coupled as shown. Here, die 0 102 is a base die with other dies stacked on top in a vertical and/or horizontal manner. As such, the dies are in a three-dimensional (3D) stack configuration. Instead of one base die 0 102, the base die can be multiple dies coupled to package substrate 101 via interconnect 108 (e.g., wire bonds, solder balls, etc.). The dies can be different types of dies. For example, the dies can be one or more of memory, compute, graphics, general processor, application specific processor, RF, etc. In one example, memory die is die 0 102 which is divided into segments or IP domains, where each IP domain can be refreshed at a rate independent of the refresh rate of other IP domains or segments of memory die 102, die 1 103 is a compute die, die 2 104 is a general processor, die 3 105 is a graphics engine or processor, die 4 106 is another general processor, while die 5 107 is an RF die or another memory die. The type of dies and their location in the stack are just examples and can be modified under the virtual thermal sensor based thermal management scheme. In some embodiments, package substrate 101 may be replaced with an interposer. The interposer may have active and/or passive components embedded in it.

Each die in the package may have one or more thermal sensors for detecting hotspots in the die IPs. When dielets are 3-D stacked, a top die may impact temperature on base die (or vice-a-versa). The dielet/IP which influence the temperature of other die, is called "Aggressor" and the dielet/IP whose temperature is influenced is called "victim". Any dielet in a package can act as an aggressor for one or more other dielets. Similarly, any dielet can be a victim of one or more aggressors. For example, die 2 104 can be victim following dielets: Die 0 102, Die 4 106, Die 5 107, from above and below. Additionally, the co-planar dielets can also influence the temperature of a dielet, for example Die 1 103 and Die 3 105 can significantly influence the temperature in IPs on the edges of Die 2 104.

In various embodiments, each die may include a digital thermal sensor (DTS). The DTS includes circuitry to detect temperature from local and/or remote diodes (thermal sensors) and circuitry to convert that detected temperature into a digital code that represents the temperature. In some embodiments, the digital code is passed to a power management unit (p-unit) of that die to process the digital code. Each p-unit can receive telemetry information (e.g., location of local and remote diodes, temperatures from each diode) from various dies to determine a virtual temperature of the die. Here, die 0 102 has DTS 102-1 and p-unit 102-8, die 1 103 includes DTS 103-1 and p-unit 103-8, die 2 104 includes DTS 104-1 and p-unit 104-8, die 3 includes DTS 105-1 and p-unit 105-8, die 4 includes DTS 106-1 and p-unit 106-8, die 5 includes DTS 107-1 and p-unit 107-8. While each die is illustrated with one DTS and one p-unit, the dies can have multiple DTSs and multiple p-units.

In some embodiments, a victim die comprises temperature reading from aggressor dielets (one or more aggressors) and victim dielet local temperature sensors to create a virtual temperature sensor. This virtual temperature sensor provides a predicted temperature for an IP domain in the victim dielet. The virtual sensor temperature is used to manage frequency, power, and/or refresh rate (or any other temperature dependent functionality) for the victim dielet's target IP domain. In various embodiments, the temperature information is communicated to victim dielet from each dielet. Each dielet can communicate the temperature information to victim, either directly or one of the dielets in the system can act as aggregator and then pass the information to the victim dielet. In some embodiments, p-units of each die communicate with one another to pass the telemetry information across dies. In some embodiments, the victim dielet maps the top die temperature to a victim domain/IP. The victim die resolves the IP/domain temperature as a maximum of local temperature and aggressor temperature. This resolved temperature is then used for determine frequency, power, and/or refresh rate etc. of the target domain. While various embodiments are illustrated with the use of maximum temperature, the aggressor may send maximum temperature, minimum temperature, or any temperature (e.g., between maximum and minimum) deemed fit for a particular case.

Figure 2:
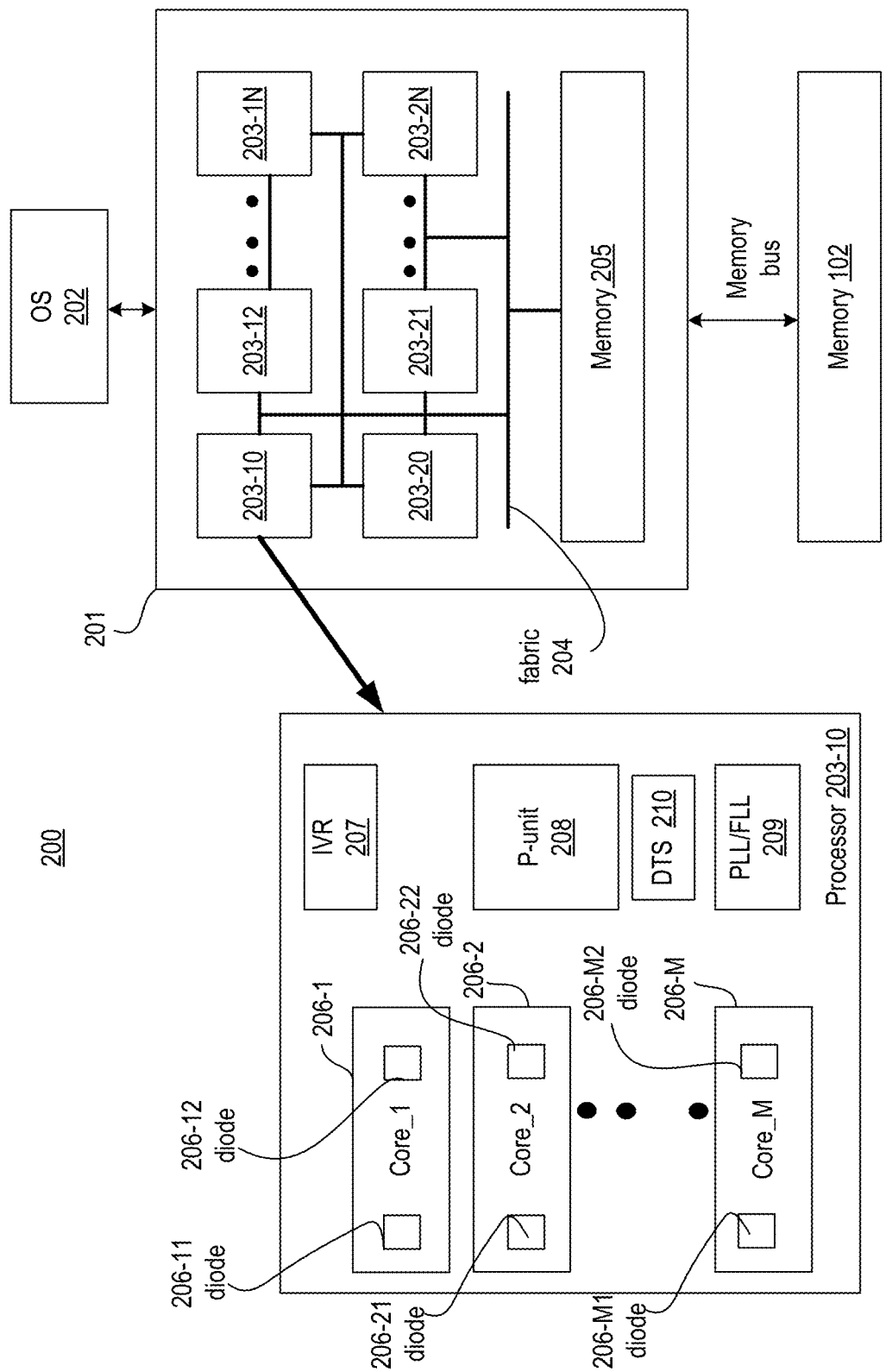
FIG. 2 illustrates a die in the multi-chip module that uses telemetry from local die sensors and from other dies to generate a virtual thermal sensing to predict temperature for the die or intellectual property domain of the die, in accordance with some embodiments.

FIG. 2 illustrates processor system 200 in the multi-chip module that uses telemetry from local die sensors and from other dies to generate a virtual thermal sensing to predict temperature for the die or intellectual property domain of the die, in accordance with some embodiments. Processor system 200 comprises processor system 201 coupled to operating system (OS) 202. Processor system 201 comprises one or more processors 203 (individually labeled as processors 203_10 through 203_1N, and 203_20 through 203_2N, where 'N' is a number), fabric 204 connecting the processor 203, and memory 205. In some embodiments, each processor 203 is a die, dielet, or chiplet. For example, each die may correspond to a die in the 3D stack of multi-chip module 100. In some embodiments, processor system 201 (e.g., comprising dies 103, 104, 105, 106, etc.) is coupled to memory die 102 (e.g., die 0 102) via a memory bus (e.g., double data rate (DDR) complaint bus). Memory die 102 can be a dynamic random-access memory (DRAM) divided into sections or segments, each having its independently controlled refresh rate.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies. Each processor 203 may also be a dielet or chiplet. Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

In some embodiments, fabric 204 is a collection of interconnects or a single interconnect that allows the various dies to communicate with one another. Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

In some embodiments, each processor 203 may include a number of processor cores. One such example is illustrated with reference to processor 203_10. In this example, processor 203_10 includes a plurality of processor cores 206-1 through 206-M, where M is a number. For the sake of simplicity, a processor core is referred by the general label 206. Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core. Processor 203_10 may include an integrated voltage regulator (IVR) 207, power control unit (p-unit) 208, phase locked loop (PLL) and/or frequency locked loop (FLL) 209. The various blocks of processor 203_10 may be coupled via an interface or fabric. Here, the term "interconnect" refers to a communication link, or channel, between two or more points or nodes. It may comprise one or more separate conduction paths such as wires, vias, waveguides, passive components, and/or active components. It may also comprise a fabric. In some embodiments, p-unit 208 is coupled to OS 202 via an interface. Here the term "interface" generally refers to software and/or hardware used to communicate with an interconnect. An interface may include logic and I/O driver/receiver to send and receive data over the interconnect or one or more wires.

In some embodiments, each processor 203 is coupled to a power supply via voltage regulator. The voltage regulator may be internal to processor system 201 (e.g., on the package of processor system 201) or external to processor system 201. In some embodiments, each processor 203 includes IVR 207 that receives a primary regulated voltage from the voltage regulator of processor system 201 and generates an operating voltage for the agents of processor 203. The agents of processor 203 are the various components of processor 203 including cores 206, IVR 207, p-unit 208, PLL/FLL 209.

Accordingly, an implementation of IVR 207 may allow for fine-grained control of voltage and thus power and performance of each individual core 206. As such, each core 206 can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. For example, each core 206 may include an IVR to manage power supply to that core where that IVR receives input power supply from the regulated output of IVR 207 or voltage regulator of processor system 201. Dining power management, a given power domain of one IVR may be powered down or off when the processor core 206 is placed into a certain low power state, while another power domain of another IVR remains active, or fully powered. As such, an IVR may control a certain domain of a logic or processor core 206. Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to as an Autonomous Perimeter (AP). A domain can be an entire system-on-chip (SoC) or part of the SoC, and is governed by a p-unit.

In some embodiments, each processor 203 includes its own p-unit 208. P-unit 208 controls the power and/or performance of processor 203. P-unit 208 may control power and/or performance (e.g., IPC, frequency) of each individual core 206. In various embodiments, p-unit 208 of each processor 203 is coupled via fabric 204. As such, the p-units 208 of each processor 203 communicate with another and OS 202 to determine the optimal power state of processor system 201 by controlling power states of individual cores 206 under their domain.

P-unit 208 may include circuitry including hardware, software and/or firmware to perform power management operations with regard to processor 203. In some embodiments, p-unit 208 provides control information to voltage regulator of processor system 201 via an interface to cause the voltage regulator to generate the appropriate regulated voltage. In some embodiments, p-unit 208 provides control information to IVRs of cores 206 via another interface to control the operating voltage generated (or to cause a corresponding IVR to be disabled in a low power mode). In some embodiments, p-unit 208 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software). In some embodiments, p-unit 208 is implemented as a microcontroller. The microcontroller can be an embedded microcontroller which is a dedicated controller or as a general-purpose controller. In some embodiments, p-unit 208 is implemented as a control logic configured to execute its own dedicated power management code, here referred to as pCode. In some embodiments, power management operations to be performed by p-unit 208 may be implemented externally to a processor 203, such as by way of a separate power management integrated circuit (PMIC) or other component external to processor system 201. In yet other embodiments, power management operations to be performed by p-unit 208 may be implemented within BIOS or other system software. In some embodiments, p-unit 208 of a processor 203 may assume a role of a supervisor or supervisee.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit In various embodiments, p-unit 208 executes a firmware (referred to as pCode) that communicates with OS 202. In various embodiments, each processor 203 includes a PLL or FLL 209 that generates clock from p-unit 208 and input clock (or reference clock) for each core 206. Cores 206 may include or be associated with independent clock generation circuitry such as one or more PLLs to control operating frequency of each core 206 independently.

In some embodiments, the thermal management scheme determines a virtual temperature for each victim die in the multichip module. Each die includes one or more thermal diodes (e.g., 206-11, 206-12 in core 206-1, 206-21 and 206-22 in core 206-2, . . . and 206-M1 and 206-M2 in core 206-M) and a digital thermal sensor (DTS) 210 that reads the temperatures from the thermal diodes and provides it to p-unit 208. Assuming for argument sake that die 203-21 is a victim die or dielet, then p-unit 208 of die 203-21 receives temperature reading from aggressor dielets (one or more aggressors) and victim dielet local temperature sensors to create a virtual temperature sensor. The aggressor dies can be any of the dies (e.g., 203-10, 203-20, 102, etc.) that generate heat which impact the temperature of victim die 203-21. This virtual temperature sensor provides a predicted temperature for an IP domain in the victim dielet 203-21. The virtual sensor temperature is used to manage frequency, power, and/or refresh rate (or any other temperature dependent functionality) for the victim dielet's target IP domain.

In various embodiments, the temperature information is communicated to victim dielet from each dielet. Each dielet can communicate the temperature information to victim, either directly or one of the dielets in the system can act as aggregator and then pass the information to the victim dielet. In some embodiments, p-units 208 of each die communicate with one another to pass the telemetry information across dies, and finally to the p-unit of the victim die. In some embodiments, the victim dielet maps the top die temperature to a victim domain/IP. The victim die resolves the IP/domain temperature as a maximum of local temperature and aggressor temperature. This resolved temperature is then used for determine frequency, power, and/or refresh rate etc. of the target domain. While the embodiments are described with reference to use of a maximum temperature from the aggressor die, the aggressor die may send maximum or minimum or any temperature deemed fit for a case.

FIGS. 3A-B illustrates top views 300 and 320, respectively, of hot spot mapping from aggressor dies to victim die, and victim die hotspots, and logic to generate virtual thermal sensing to predict temperature for the victim die using telemetry from aggressor dies, in accordance with some embodiments. In this example, top view 300 illustrates the hot spots 301 in dies 103, 104, and 105. Typically, thermal sensors are placed at the hot spots. Die 0 102 is the bottom die which is below dies 102, 104, and 105 as illustrated in FIG. 1. In some embodiments, die 0 102 comprises multiple IP domains (IPDs) such as IPD1, IPD2, IPD3, IPD4, IPD5, IPD6, IPD7, and IPD8. Each IPD may receives heat from hot spots of the dies above it. Such images of hot spots from neighboring dies is illustrated by hot spot 302. Each IPD may further include its own hot spot 303 and associated thermal sensor for that hot spot. In this example, bottom die 0 102 is a victim die while top dies 103, 104, and 105 are the aggressor dies.

In some embodiments, temperatures from the temperature sensors of one or more aggressor dies is used to manage power or performance of the IPDs in victim die 102. Along with the temperatures from the one or more aggressor dies, temperature data from thermal sensors of the victim die 102 is also used to manage power or performance of the IPDs in victim die 102. In some embodiments, the telemetry data from the one or more aggressor dies can include temperature data of individual thermal sensors or can aggregate data from multiple thermal sensors into a single value before transmitting the telemetry data (as a single data) to victim die 102.

In the case die 0 102 is a memory die, it is not necessary to refresh the whole memory at same refresh rate as the temperature is not same across the whole memory dielet 102, i.e. some areas will have higher temperature due to access patterns or aggressor influence while the other areas will be cooler. The memory power is a function of memory refresh rate (higher refresh rate, higher memory power consumption) and the refresh rate is a function of temperature. To efficiently manage the memory power, the memory is partitioned into smaller chunks or IP domains with respect to overall memory size. These memory chunks are called 'refresh domains' and can be refreshed at an independent refresh rate. The area of a refresh domain can be quite large (for example 6 mm×6 mm) and it can be victim to multiple IP/temperature sensors in the aggressor dielet(s). In one such case, to reduce the telemetry and make dielets independent of each other's micro-architectural (physical) details, various embodiments abstract the large area of the victim die as a Tile.

The tile can represent independent IP, or groups of IPs or a refresh domain in the victim die. Any IP, subsystem, or domain represented by a tile in the victim die uses the virtual sensor temperature to manage its temperature dependent functionality. In general, the following relationship are true for aggressor(s) and a victim. For instance, a remote die IP (temperature sensor) can be aggressor for one or more tiles in the base (victim) die (e.g., one aggressor and multiple victims). Multiple remote die IPs can act be aggressor for the same base die tile (e.g., multiple aggressors and one victim). Multiple dielets can act as aggressor for the same victim.

In some embodiments, information (e.g., temperature data) from a tile in a top die (e.g., above a base die such as die 0 102) can be used by a tile of a base die without a mapping. For example, temperature data from a tile in Die 2 103 can be used by IPD1 of die 0 102, where IPD1 is a tile not directly below the tile in Die 2 103. In some embodiments, temperature data from a tile of Die 1 103 is provide to multiple tiles below Die 1 103. For example, temperature data from a tile of Die 1 103 is provided to IPD1 and IPD2 of die 0 102 because the temperature from tile of Die 1 103 impacts different IPDs in base die Die 0 102. As described herein, a tile may represent a large area like memory refresh domain or a tile may represent a single IPD of a victim die. In some cases, tile mapping between a heat source (e.g., aggressor tile in an aggressor die) is not used for a destination die (e.g., victim tile in a victim die). For example, aggressor die may aggregate temperature information from other aggressor dies and then send data to the victim die.

In some embodiments, the thermal management scheme determines a virtual temperature for die 0 102 in the multichip module. P-unit of victim die or dielet 102 receives temperature reading from aggressor dielets 103, 104, and 105 and victim dielet local temperature sensors in hot spots 303 to create a virtual temperature sensor. This virtual temperature sensor provides a predicted temperature for an IP domain in the victim dielet 102. The virtual sensor temperature is used to manage frequency, power, and/or refresh rate (or any other temperature dependent functionality) for the victim dielet's target IP domain (e.g., any of the IPDs). In various embodiments, the temperature information is communicated to victim dielet from each dielet. Each dielet can communicate the temperature information to victim, either directly or one of the dielets in the system can act as aggregator and then pass the information to the victim dielet. In some embodiments, p-units 208 of each die communicate with one another to pass the telemetry information across dies, and finally to the p-unit of victim die 102. In some embodiments, victim dielet 102 maps the top die temperature to a victim domain/IP as illustrated by image hot spot 302. Victim die 102 resolves the IP/domain temperature as a maximum of local temperature and aggressor temperature. This resolved temperature is then used for determine frequency, power, and/or refresh rate etc. of the target IPD. While various embodiments are illustrated with the use of maximum temperature, the aggressor may send maximum temperature, minimum temperature, or any temperature (e.g., between maximum and minimum) deemed fit for a particular case.

For example, based on the temperature (also referred to as the resolved temperature) determined by the virtual temperature sensor, the p-unit of victim die 102 (in the case a memory die) may reduce refresh rate of IPD1 while increase refresh rate of IPD8 because the temperature of IPD1 may be higher than a threshold temperature while the temperature of IPD8 is still below a threshold level. For a non-memory victim die (e.g., a die with processor cores and not just a contiguous large portion of memory), based on the temperature determined by the virtual sensor, the p-unit of victim die 102 may reduce frequency of an IP domain (e.g., IP2) because temperature increased in aggressor dies above it (e.g., die 1 103, die 2 104, and die 3 105). In some embodiments, the p-unit adjusts a voltage, frequency, bandwidth, and/or refresh rate of victim die 102 if the resolved temperature is a above a threshold. The threshold can be a single threshold or a gradually adjusted threshold. Gradual adjustment to a threshold can be done by a proportional-integral-derivative controller (PID controller or three-term controller). The PID controller may monitor the resolved temperature continuously and perform gradual changes based on a difference between a control temperature and the resolved temperature. In some embodiments, the p-unit implements the PID controller. In some embodiments, PID controller is separate from the p-unit.

Figure 4:
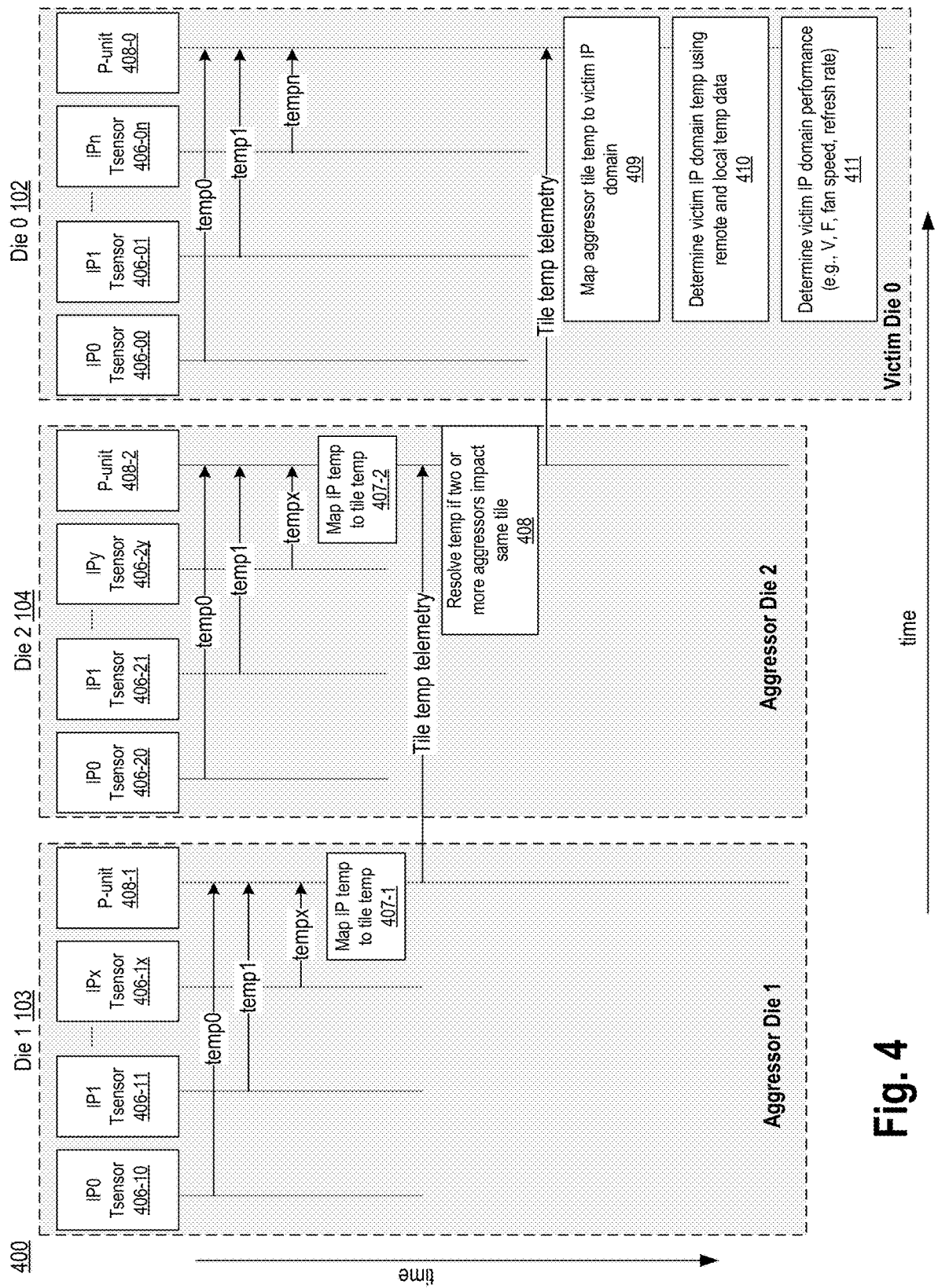
FIG. 4 illustrates a flowchart of a virtual thermal sensing scheme to determine victim die temperature using telemetry from aggressor dies, in accordance with some embodiments.

FIG. 4 illustrates flowchart 400 of a virtual thermal sensing scheme to determine victim die temperature using telemetry from aggressor dies, in accordance with some embodiments. While various blocks are shown in a particular order, some blocks can be performed before others or simultaneously. The operations of each block can be performed by hardware, software, or a combination of them. Flowchart 400 illustrates a timing diagram as time flow from top to bottom and right to left.

Flowchart 400 does three dies—die 1 103, die 2 104, and die 0 102. In this example, Die 1 103 and Die 2 104 are the aggressor dies while die 0 102 is the victim die. While the examples show two dies as aggressor dies, any number of dies may be aggressor dies that impact the temperature of victim die. Each die has a number of IP domains with corresponding thermal sensors (diodes) for that IP domain. For example, die 1 103 includes IP domain thermal sensor (Tsensor) 406-10 through 406-1$x$, die 2 104 includes IP domain thermal sensor (Tsensor) 406-20 through 406-2$y$, and die 0 102 includes IP domain thermal sensor (Tsensor) 406-00 through 406-0$n$. In some embodiments, each die has its own p-unit. The p-unit can be a supervisor p-unit. For instance, die 1 103 includes p-unit 408-1, die 2 104 includes p-unit 408-2, and die 0 102 includes p-unit 408-0.

At block 407-1 p-unit 408-1 of aggressor die 1 103 collects temperature readings from individual thermal sensors for various IP domains of Die 1 103. For example, p-unit 408-1 receives temp0 from IP0 Tsensor 406-10, p-unit 408-11 receives temp1 from IP1 Tsensor 406-11, . . . , and tempx from IPx Tsensor 406-1$x$. P-unit 408-1 then maps IP temperature to tile temperature. The same process is repeated for each aggressor die. For example, at block 407-2 p-unit 408-2 of aggressor die 2 104 collects temperature readings from individual thermal sensors for various IP domains of Die 2 104. For example, p-unit 408-2 receives temp0 from IP0 Tsensor 406-20, p-unit 408-21 receives temp1 from IP1 Tsensor 406-21, . . . , and tempy from IPy Tsensor 406-2$y$. P-unit 408-2 then maps IP temperature to tile temperature. The tile telemetry data is them communicated between aggressor dies (or to one aggressor die). One of the aggressor dies then resolved the temperature for a tile if two or more aggressors impact the same tile, as indicated by block 408. While block 408 is illustrated as happening in die 2, it can happen in die 1 where die 2 sends the telemetry data to die 1. Upon resolving the temperature for the same tile, the new tile telemetry temperature is sent to the victim die.

Like the aggressor dies, p-unit 408-0 of victim die 0 102 also collects local temperatures from its IP domains. For example, p-unit 408-0 receives temp0 from IP0 Tsensor 406-00, p-unit 408-0 receives temp1 from IP1 Tsensor 406-01, . . . , and tempn from IPn Tsensor 406-0n. P-unit 408-0 also receives the resolved tile temperature telemetry.

To reduce the cross-die telemetry, in some embodiments, the top dielets map the temperature data from each IP or die temperature sensor to a tile granularity. In some embodiments, the top dielets contain a sensor to Tile "aggressor-victim" map/table. The map contains following information for each victim:

BASE_DIE_VICTIMn_TILE_NUM: Tile number of victim 'n'.

BASE_DIE_VICTIMn_AGRESSORS A list/bitmap of IPs or thermal sensors influencing a tile.

The tile temperature is calculated as maximum temperature of all IPs which are aggressor for a same tile. (Note, the tile mapping is abstraction of die micro-architecture). In some embodiments, (e.g., in case of non-memory IPs), each tile is mapped to just a victim IP number.

In some embodiments, the top dielet acts as aggregator for telemetry from all top dielets and resolves the tile temperature to maximum temperature among all top dielets. In other implementation, each dielet telemetry can be communicated to victim dielet and the victim dielet can resolve the temperature when multiple aggressor impact the same tile. The aggressor temperature is then communicated to p-unit 408-0 of victim die 0 102 (can be pushed or pulled). In some embodiments, then the top die/aggressor enters a low power state where the temperature data is no longer valid, the tile temperature is invalidated and same is communicated to victim die. In some embodiments, OS 202 or p-unit of the aggressor die informs the p-unit of the victim die that the aggressor die has entered low power mode, and so the tile temperature data from the aggressor die is discarded.

At block 409, victim die 0 102 maps the tile temperature to a local IP/domain within victim die 0 102. Here, aggressor or remote temperature is mapped to victim domain. In some embodiments, as the temperature communication from aggressor to victim has some propagation delay, victim die 0 102 can add some guard-band to the aggressor reported temperature value to account for temporal gradient (e.g., base or victim die rate of temperature change due to aggressor). Since the temperature communication across dielets is done at tile granularity, domain remote temperature can be computed as:

domain_remote_temperature=tile2domain (tile temperature+tile guardband)

Note, it is possible to add the guardband in either aggressor or victim dies. The victim base die may have per IP temperature sensor or a global sensor pool which may impact one or more domains. The global sensor pool may be used in dielets containing memory technology.

In case of IP integration temperature:

Domain_local_temperature=IP_sensor_temperature

In case of global sensor impacting multiple IPs/domain, victim die has a mapping table (fused or hardcoded or programmable) which indicates which sensor temperature impacts a domain/IP.

Domain_local_temperaure=DTS2Domain(Sensor Temperature).

At block 410, temperature of the victim IP domain is determined using remote telemetry data and local temperature data of victim die. Logically, the resolved temperature of the IP/domain is maximum(domain_local_temperaure, domain_remote_temperaure). The domain temperature resolution also considers if the top die temperature is valid or not. When the top die (aggressor) enters a low power state (temperature unavailable), the base die (victim) gets in indication that aggressor temperature is not valid. When top die temperature becomes invalid, the resolved temperature gradually decays to the domain_local_temperature in TEMP_DECAY_STEP step size.

Here, resolved temperature (Resolved temp) is a domain resolved temperature (domain_resolved_temp), local temperature (Local temp) is domain local temperature (domain_local_temp), previous resolved temperature (Prev_resolved_temp) is domain previous resolved temperature (domain_prev_resolved_temp).

If (aggressor_temp_valid)
   domain_resolved_temp=max (domain_local temp, domain_remote_temp)
Else if (!aggressor_temp_valid)
   If (domain_local_temp+TEMP_DECAY_STEP<domain_prev_resolved_temp)
     domain_resolved temp=domain_prev_resolved_temp−TEMP_DECAY_STEP
   Else
     domain_resolved temp=domain_local temp Here, tile temperature is the aggressor temperature for a victim tile, domain, or IP block. Time2domain is the logic mapping of an abstract tile to a physical domain or IP block. Aggressor_temp_valid refers to an indication from the aggressor domain that the aggressor temperature is valid or invalid. Domain_resolved_temp is the final temperature for a domain or IP block after considering local and remote temperatures. Domain_prev_resolved_temp is a domain resolved temperature during previous iteration.

At block 411, victim die 0 102 then determines an action plan to manage thermals of victim die. For example, victim die 0 102 may adjust (e.g., reduce) voltage and to frequency to an IP domain of victim die 0 102 whose temperature is found to be above a threshold (e.g., programmable threshold). In some embodiments, victim die 0 102 may send a signal (e.g., PROCHOT) to cause a cooling system of the package to increase cooling. For example, victim die 0 102 may send a signal to increase fan speed. In some embodiments, when victim die 0 102 is a memory die, the p-unit of the victim die uses the resolved temperature to determine refresh rate of the memory or section of the memory.

Elements of embodiments are also provided as a machine-readable medium (e.g., memory) for storing the computer-executable instructions (e.g., instructions to implement any other processes discussed herein). In some embodiments, a computing platform comprises a memory, a processor, a machine-readable storage media (also referred to as tangible machine readable medium), a communication interface (e.g., wireless or wired interface), and a network bus coupling them.

In some embodiments, the processor is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks of the system are coupled together via the network bus. Any suitable protocol may be used to implement the network bus. In some embodiments, the machine-readable storage medium includes instructions (also referred to as the program software code/instructions) for intelligent prediction of processor idle time as described with reference to the various embodiments and flowchart.

Program software code/instructions associated with flowchart 400 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowchart 500 (and/or various embodiments) are executed by the computer system.

In some embodiments, the program software code/instructions associated with flowchart 400 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with flowchart 400 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, magnetic random-access memory, ferroelectric memory, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, the tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry®, Nexus®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

Figure 5:
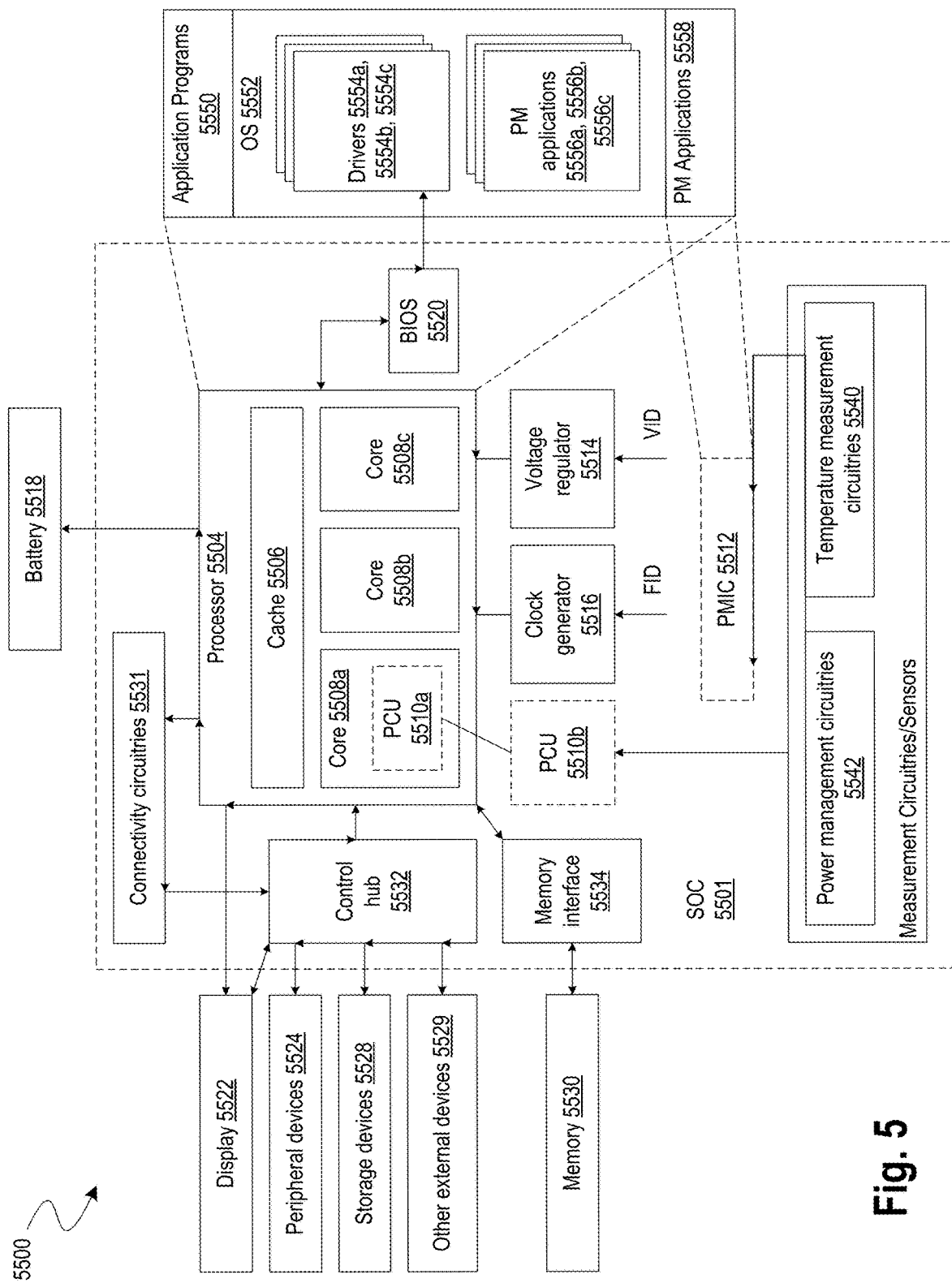
FIG. 5 illustrates a smart device or a computer system or an SoC (System-on-Chip) having horizontally and/or vertically stacked dies with apparatus and/or mechanism for virtual thermal sensing, in accordance with some embodiments.

FIG. 5 illustrates a smart device or a computer system or an SoC (System-on-Chip) having horizontally and/or vertically stacked dies with apparatus and/or mechanism for virtual thermal sensing, in accordance with some embodiments. It is pointed out that those elements of FIG. 5 having the same reference numbers (or names) as the elements of any other figure may operate or function in any manner similar to that described, but are not limited to such. Any block herein can have the apparatus and/or mechanism for virtual thermal sensing.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 5, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508*a*, 5508*b*, 5508*c*. Although merely three cores 5508*a*, 5508*b*, 5508*c* are illustrated in FIG. 5, processor 5504 may include any other appropriate number of processing cores, e.g., tens, or even hundreds of processing cores. Processor cores 5508*a*, 5508*b*, 5508*c* may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508*a*, a second section of cache 5506 dedicated to core 5508*b*, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware including an antenna) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510*a/b* and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, battery 5518 is a multi-battery system with workload dependent load-sharing mechanism. The mechanism is an energy management system that operates in three modes—energy saving mode, balancer mode, and turbo mode. The energy saving mode is a normal mode where the multiple batteries (collectively shown as battery 5518) provide power to their own set of loads with least resistive dissipation. In balancing mode, the batteries are connected through switches operating in active mode so that the current shared is inversely proportion to the corresponding battery state-of-charge. In turbo mode, both batteries are connected in parallel through switches (e.g., on-switches) to provide maximum power to a processor or load. In some embodiments, battery 5518 is a hybrid battery which comprising a fast charging battery and a high energy density battery. Fast charging battery (FC) means a battery capable of faster charging than high energy density battery (HE). FC may be today's Li-ion battery as it is capable of faster charging than HE. In some embodiments, a controller (part of battery 5518) optimizes the sequence and charging rate for the hybrid battery to maximize both the charging current and charging speed of the battery, while enabling longer battery life.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, battery 5518 includes hybrid technologies. For example, a mix of high energy density charge (e.g., Li-Ion batteries) carrying device(s) and low energy density charge carrying devices (e.g., supercapacitor) are used as batteries or storage devices. In some embodiments, a controller (e.g., hardware, software, or a combination of them) is used analyze peak power patterns and minimizes the impact to overall lifespan of high energy density charge carrying device-based battery cells while maximizing service time for peak power shaving feature. The controller may be part of battery 5518 or part of p-unit 5510*b*.

In some embodiments, pCode executing on PCU 5510*a/b* has a capability to enable extra compute and telemetries resources for the runtime support of the pCode. Here pCode refers to a firmware executed by PCU 5510*a/b* to manage performance of the SoC 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc,th) based on the available battery power (which changes slowly) and set the SoC throttling peak power (Psoc,th). In some embodiments, pCode decides the frequencies and voltages based on Psoc,th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

In some embodiments, a hardware and software coordinated processor power state policy (e.g., policy for C-state) is implemented that delivers optimal power state selection by taking in to account the performance and/or responsiveness needs of thread expected to be scheduled on the core entering idle, to achieve improved instructions per cycle (IPC) and performance for cores running user critical tasks. The scheme provides the ability to deliver responsiveness gains for important and/or user-critical threads running on a system-on-chip. P-unit 5510 which coupled to the plurality of processing cores, receives a hint from operating system 5552 indicative of a bias towards a power state or performance state for at least one of the processing cores of the plurality of processing cores based on a priority of a thread in context switch.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

Various embodiments are provided as examples. These examples can be combined with any other example to form distinct embodiments. For example, example 4 can be combined with example 7.

Example 1: A first die comprising: a plurality of thermal sensors including a first sensor and a second sensor, wherein the first sensor is to provide a first temperature of a first domain, wherein the second sensor is to provide a second temperature of a second domain; and a power management unit to receive the first temperature and the second temperature, wherein the power management unit is to receive telemetry temperature data from one or more sensors of a second die, wherein the first die and the second die are in a horizontal or vertical stack of a multichip module, wherein the power management unit is to determine a resolved temperature of the first die or an intellectual property domain of the first die in accordance with the first temperature, the second temperature, and the telemetry temperature data.

Example 2: The first die of example 1, wherein the telemetry temperature data from the second die includes a level maximum of all temperatures of a plurality of domains in the second die, wherein the plurality for domain in the second die are aggressors to a tile of the first die.

Example 3: The first die of example 2, wherein the level is one of: a maximum level, a minimum level, or a level between the maximum level and the minimum level.

Example 4: The first die of example 2, wherein the first domain is part of the tile of the first die, wherein the power management unit maps a temperature of the tile of the first die to the first domain of the first die.

Example 5: The first die of example 4, wherein the power management unit adds a guard band to the temperature of the tile.

Example 6: The first die of example 1, wherein the second die is an aggressor die, and wherein the first die is a victim die.

Example 7: The first die of example 1, wherein the telemetry data of the second die is invalidated when the second die enters a low power state.

Example 8: The first die of example 7, wherein the power management unit is informed that the telemetry data of the second die is invalidated.

Example 9: The first die of example 1, wherein the power management unit is to adjust performance of the first die if the resolved temperature is above a threshold.

Example 10: The first die of example 1, wherein the power management unit is to adjust voltage, frequency, bandwidth, and/or refresh rate of a domain of the first die if the resolved temperature is above a threshold.

Example 11: A machine-readable storage media having machine-executable instructions stored there on that when executed cause one or more processors to perform a method comprising: sensing a first temperature of a first domain of a first die; sensing a second temperature of a second domain of the first die; receiving the first temperature and the second temperature; receiving telemetry temperature data from one or more sensors of a second die, wherein the first die and the second die are in a horizontal or vertical stack of a multichip module; determining a resolved temperature of the first die or an intellectual property domain of the first die in accordance with the first temperature, the second temperature, and the telemetry temperature data.

Example 12: The machine-readable storage media of example 11, wherein the telemetry temperature data from the second die includes a level of all temperatures of a plurality of domains in the second die, wherein the plurality for domain in the second die are aggressors to a tile of the first die.

Example 13: The machine-readable storage media of example 12, wherein the level is one of: a maximum level, a minimum level, or a level between the maximum level and the minimum level.

Example 14: The machine-readable storage media of example 12, wherein the level one or more temperature levels.

Example 15: The machine-readable storage media of example 13, wherein the first domain is part of the tile of the first die, wherein the method comprises mapping a temperature of the tile of the first die to the first domain of the first die.

Example 16: The machine-readable storage media of example 15 having machine-executable instructions stored there on that when executed cause the one or more processors to perform a further method comprising: adding a guard band to the temperature of the tile.

Example 17: The machine-readable storage media of example 11, wherein the second die is an aggressor die, and wherein the first die is a victim die.

Example 18: The machine-readable storage media of example 11, wherein the telemetry data of the second die is invalidated when the second die enters a low power state.

Example 19: The machine-readable storage media of example 18, having machine-executable instructions stored there on that when executed cause the one or more processors to perform a further method comprising: informing that the telemetry data of the second die is invalidated.

Example 20: The machine-readable storage media of example 11, having machine-executable instructions stored there on that when executed cause the one or more processors to perform a further method comprising: adjusting performance of the first die if the resolved temperature is above a threshold.

Example 21: The machine-readable storage media of example 11, having machine-executable instructions stored there on that when executed cause the one or more processors to perform a further method comprising: adjusting voltage, frequency, bandwidth, and/or refresh rate of a domain of the first die if the resolved temperature is above a threshold.

Example 22: A system comprising: a package substrate; a first die on the package substrate; a second die adjacent to the first die, wherein the first die is according to any one of examples 1 to 11.

Example 23: A system comprising: a memory; and a package communicatively coupled to the memory, the package comprising: a substrate or interposer; a first die on the substrate or interposer; and a second die adjacent to the first die, wherein the first die comprises: a plurality of thermal sensors including a first sensor and a second sensor, wherein the first sensor is to provide a first temperature of a first domain, wherein the second sensor is to provide a second temperature of a second domain; and a power management unit to receive the first temperature and the second temperature, wherein the power management unit is to receive telemetry temperature data from one or more sensors of the second die, wherein the power management unit is to adjust performance for a domain of the first die, that does not have a sufficient local temperature sensor, based on the first temperature, the second temperature, and the telemetry temperature data.

Example 24: The system of claim 23, wherein: the telemetry temperature data from the second die includes a maximum of all temperatures of a plurality of domains in the second die, wherein the plurality for domains in the second die are aggressors to a tile of the first die; the domain of the first die is part of the tile of the first die, wherein the power management unit maps a temperature of the tile of the first die to the domain of the first die; and the power management unit adds a guardband to the temperature of the tile.

Example 25: The system of claim 23, wherein either the first die or the second die is an aggressor die.

Example 26: A machine-readable storage media having machine-executable instructions stored there on that when executed cause one or more processors to perform a method comprising: sensing a first temperature of a first domain of a first die; sensing a second temperature of a second domain of the first die; receiving the first temperature and the second temperature; receiving telemetry temperature data from one or more sensors of a second die, wherein the first die and the second die are in a stack of a multichip module; and adjusting performance for a region of the first die, that does not have a sufficient temperature sensor, based on the first temperature, the second temperature, and the telemetry temperature data.

Example 27: The machine-readable storage media of claim 26, wherein the telemetry temperature data from the second die includes a level of all temperatures of a plurality of domains in the second die, wherein the plurality for domains in the second die are aggressors to a tile of the first die.

Example 28: The machine-readable storage media of claim 26, wherein adjusting performance for the region comprises adjusting voltage, frequency, bandwidth, or refresh rate of a domain of the first die if a resolved temperature is above a threshold, wherein the resolved temperature is based on the first temperature, the second temperature, and the telemetry temperature data.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
a first die; and
a second die, wherein the first die and the second die are in a stack of a multichip module, wherein the first die includes:
a plurality of thermal sensors including a first sensor and a second sensor, wherein the first sensor is to provide a first temperature of a first domain, wherein the second sensor is to provide a second temperature of a second domain; and
a power management unit to receive the first temperature and the second temperature, wherein the power management unit is to receive telemetry temperature data from one or more sensors of the second die, wherein the power management unit is to determine a virtual temperature of an IP domain of the first die in accordance with the first temperature, the second temperature, and the telemetry temperature data, wherein the virtual temperature is a predicted temperature for the IP domain based on the first temperature, second temperature, and the telemetry temperature data.

2. The apparatus of claim 1, wherein the telemetry temperature data from the second die includes a level of all temperatures of a plurality of domains in the second die, wherein the plurality for domains in the second die are aggressors to a tile of the first die.

3. The apparatus of claim 2, wherein the level is one of: a maximum level, a minimum level, or a level between the maximum level and the minimum level.

4. The apparatus of claim 2, wherein the IP domain of the first die is part of the tile of the first die, wherein the power management unit maps a temperature of the tile of the first die to the IP domain of the first die.

5. The apparatus of claim 4, wherein the power management unit adds a guardband to the temperature of the tile.

6. The apparatus of claim 1, wherein the second die is an aggressor die, and wherein the first die is a victim die.

7. The apparatus of claim 1, wherein the telemetry data of the second die is invalidated when the second die enters a low power state.

8. The apparatus of claim 7, wherein the power management unit is informed that the telemetry data of the second die is invalidated.

9. The apparatus of claim 1, wherein the power management unit is to adjust performance of the first die if the virtual temperature is above a threshold.

10. The apparatus of claim 1, wherein the power management unit is to adjust voltage, frequency, bandwidth, or refresh rate of a domain of the first die if the virtual temperature is above a threshold.

11. The apparatus of claim 1, wherein the stack is a vertical stack.

12. The apparatus of claim 1, wherein the die is a horizontal stack.

13. A machine-readable storage media having machine-executable instructions stored there on that when executed cause one or more processors to perform a method comprising:
   sensing a first temperature of a first domain of a first die;
   sensing a second temperature of a second domain of the first die;
   receiving the first temperature and the second temperature;
   receiving telemetry temperature data from one or more sensors of a second die, wherein the first die and the second die are in a stack of a multichip module; and
   determining a virtual temperature of the first die for an IP domain of the first die in accordance with the first temperature, the second temperature, and the telemetry temperature data, wherein the virtual temperature is a predicted temperature for the IP domain based on the first temperature, second temperature, and the telemetry temperature data.

14. The machine-readable storage media of claim 13, wherein the telemetry temperature data from the second die includes a level of all temperatures of a plurality of domains in the second die, wherein the plurality for domains in the second die are aggressors to a tile of the first die.

15. The machine-readable storage media of claim 14, wherein the level is one of: a maximum level, a minimum level, or a level between the maximum level and the minimum level.

16. The machine-readable storage media of claim 15, wherein the IP domain of the first die is part of the tile of the first die, wherein the method comprises mapping a temperature of the tile of the first die to the domain of the first die.

17. The machine-readable storage media of claim 16 having machine-executable instructions stored there on that when executed cause the one or more processors to perform a further method comprising:
   adding a guardband to the temperature of the tile.

18. The machine-readable storage media of claim 14, wherein the level includes one or more temperature levels.

19. The machine-readable storage media of claim 13, wherein the second die is an aggressor die, and wherein the first die is a victim die.

20. The machine-readable storage media of claim 13, wherein the telemetry data of the second die is invalidated when the second die enters a low power state.

21. The machine-readable storage media of claim 20, having machine-executable instructions stored there on that when executed cause the one or more processors to perform a further method comprising:
   informing that the telemetry data of the second die is invalidated.

22. The machine-readable storage media of claim 13, having machine-executable instructions stored there on that when executed cause the one or more processors to perform a further method comprising:
   adjusting performance of the first die if the virtual temperature is above a threshold.

23. The machine-readable storage media of claim 13, having machine-executable instructions stored there on that when executed cause the one or more processors to perform a further method comprising:
   adjusting voltage, frequency, bandwidth, or refresh rate of the IP domain of the first die if the virtual temperature is above a threshold.

24. The machine-readable storage media of claim 13, wherein the stack is a horizontal stack or a vertical stack.

25. A system comprising:
   a memory; and
   a package communicatively coupled to the memory, the package comprising:
      a substrate or interposer;
      a first die on the substrate or interposer; and
      a second die adjacent to the first die, wherein the first die comprises:
         a plurality of thermal sensors including a first sensor and a second sensor, wherein the first sensor is to provide a first temperature of a first domain, wherein the second sensor is to provide a second temperature of a second domain; and
         a power management unit to receive the first temperature and the second temperature, wherein the power management unit is to receive telemetry temperature data from one or more sensors of the second die, wherein the power management unit is to adjust performance for a third domain of the first die, that does not have a sufficient local temperature sensor, based on a determined virtual temperature, wherein the virtual temperature is a predicted temperature for the third domain based on the first temperature, second temperature, and the telemetry temperature data.

26. The system of claim 25, wherein:
   the telemetry temperature data from the second die includes a maximum of all temperatures of a plurality of domains in the second die, wherein the plurality for domains in the second die are aggressors to a tile of the first die;
   the third domain of the first die is part of the tile of the first die, wherein the power management unit maps a temperature of the tile of the first die to the third domain of the first die; and
   the power management unit adds a guardband to the temperature of the tile.

27. The system of claim 25, wherein either the first die or the second die is an aggressor die.

28. A machine-readable storage media having machine-executable instructions stored there on that when executed cause one or more processors to perform a method comprising:

sensing a first temperature of a first domain of a first die;
sensing a second temperature of a second domain of the first die;
receiving the first temperature and the second temperature;
receiving telemetry temperature data from one or more sensors of a second die, wherein the first die and the second die are in a stack of a multichip module; and
adjusting performance for a region of the first die, that does not have a sufficient temperature sensor, based on a virtual temperature determined from the first temperature, the second temperature, and the telemetry temperature data.

29. The machine-readable storage media of claim 28, wherein the telemetry temperature data from the second die includes a level of all temperatures of a plurality of domains in the second die, wherein the plurality for domains in the second die are aggressors to a tile of the first die.

30. The machine-readable storage media of claim 28, wherein adjusting performance for the region comprises adjusting voltage, frequency, bandwidth, or refresh rate of a the third domain of the first die if a resolved temperature is above a threshold, wherein the resolved temperature is based on the first temperature, the second temperature, and the telemetry temperature data.

* * * * *